(12) United States Patent
Buttiglione et al.

(10) Patent No.: US 12,000,635 B2
(45) Date of Patent: Jun. 4, 2024

(54) REVERSIBLE DEVICE FOR THE PRODUCTION OF HOT AND COLD AIR

(71) Applicant: AIRCODUE S.R.L., Naples (IT)

(72) Inventors: Luigi Buttiglione, Naples (IT); Massimiliano Marani, Naples (IT); Vincenzo Dirella, Naples (IT)

(73) Assignee: AIRCODUE S.R.L., Naples (IT)

( * ) Notice: Subject to any disclaimer, the term of this patent is extended or adjusted under 35 U.S.C. 154(b) by 0 days.

(21) Appl. No.: 18/261,599

(22) PCT Filed: Apr. 9, 2021

(86) PCT No.: PCT/IT2021/050104
§ 371 (c)(1),
(2) Date: Jul. 14, 2023

(87) PCT Pub. No.: WO2022/149174
PCT Pub. Date: Jul. 14, 2022

(65) Prior Publication Data
US 2024/0093925 A1 Mar. 21, 2024

(30) Foreign Application Priority Data
Jan. 7, 2021 (IT) .......................... 102021000000173

(51) Int. Cl.
*F25B 13/00* (2006.01)
*F25B 47/02* (2006.01)

(52) U.S. Cl.
CPC ............ *F25B 47/025* (2013.01); *F25B 13/00* (2013.01)

(58) Field of Classification Search
CPC ............ F24F 13/00–32; F24F 7/00–10; B62D 25/142; B60H 1/241; B64D 2013/003;
(Continued)

(56) References Cited

U.S. PATENT DOCUMENTS 6,038,879 A    3/2000  Turcotte et al.
6,113,483 A *  9/2000  Schambre .......... B60H 1/00842
                                                454/121
(Continued)

FOREIGN PATENT DOCUMENTS

EP        1890090 A1    2/2008

OTHER PUBLICATIONS

European Patent Office, International Search Report for PCT/IT2021/050104, dated Oct. 15, 2021, European Patent Office, P.B. 5818 Patentlaan 2, NL-2280 HV Jijswijk.
(Continued)

*Primary Examiner* — Miguel A Diaz
(74) *Attorney, Agent, or Firm* — Underwood & Associates, LLC

(57) ABSTRACT

A reversible heat pump device (100) is described by means of an appropriate direction of air flows, with R744 refrigerant (natural gas, non-toxic, non-flammable, readily available), for the production of hot and cold air; the device object of the present invention is composed of a suction damper system (1) consisting of concentric cylinders (A, B, C), designed to implement the reversibility of the operation between heating and cooling), and a refrigeration circuit comprising: cold exchanger (2) and a hot exchanger (3), located between the intake damper system (1) and the delivery damper system (4) consisting of concentric cylinders (D, E, F), also designed to implement the reversibility of operation in a manner consistent with the system of intake dampers (1).

11 Claims, 22 Drawing Sheets

(58) Field of Classification Search
CPC ... B63J 2/10; B63J 2/02; B66B 11/024; F25B 13/00; F25B 47/025
See application file for complete search history.

(56) References Cited

U.S. PATENT DOCUMENTS

2017/0320372 A1* 11/2017 Aizawa .............. B60H 1/00685
2019/0092126 A1    3/2019 Klinkhammer

OTHER PUBLICATIONS

European Patent Office, Written Opnion of the International Searching Authority for PCT/IT2021/050104, dated Oct. 15, 2021, European Patent Office, P.B. 5818 Patentlaan 2, NL-2280 HV Jijswijk.

* cited by examiner

REVERSIBLE DEVICE FOR THE PRODUCTION OF HOT AND COLD AIR

The present invention refers to a reversible air/air device for the production of hot and cold air, based on a system of rotating cylindrical shutters having carbon dioxide as a refrigerant fluid.

Carbon dioxide, chemical name carbon dioxide (CO2), other name R744, is a natural gas, non-toxic and non-flammable, which does not contribute to the depletion of the ozone layer, has an extremely low direct greenhouse effect and is widely available.

The refrigeration circuits of traditional heat pumps use refrigerant gases based on Hydrofluorocarbons (HFCs) and are designed to reverse the operating cycle: in the cooling phase the exchanger of the air handling unit (AHU) is crossed by the low temperature (evaporation), while during heating the same exchanger is crossed by high temperature refrigerant (condensation).

A refrigeration circuit that uses CO2 as the refrigerant fluid, based on a transcritical cycle, i.e. a thermodynamic cycle that performs the cooling transformation above the critical point of the fluid, presents greater complexity for the cycle inversion than a system that uses refrigerant gases based on Hydrofluorocarbons (HFCs), for many reasons such as:

traditional heat pumps with HFCs are based on a refrigeration cycle which is reversed by means of four-way reversing valves, which appropriately direct the refrigerant fluid towards the exchangers. In the case of the CO2 transcritical cycle, the pressures are very high (above 100 bar) therefore the reversing organs (diverter valves and all the refrigeration components) are considerably "stressed" by the sudden pressure jumps that are generated in cycle reversals. In transcritical carbon dioxide circuits, therefore, it would be necessary to use a large number of valves to close/open the ways suitable for appropriately directing the refrigerant towards the exchangers and adopting strategies for pressure reduction during cycle inversions.

The CO2 cycle has low yields in conditions of high external temperature; in order to improve the efficiency of the heat pump, measured by the coefficient of performance (COP), the circuits must be equipped with regulation organs and special components such as ejectors, liquid separators, pressure regulating valves, etc.

Some are installed on the low pressure branch and others on the high pressure branch, making cycle inversion on the refrigeration circuit complex and expensive.

The exchangers for CO2 machines perform different functions: the exchanger in the low pressure branch, in analogy with traditional refrigeration machines (with HFC), allows an isobaric phase change (evaporation); the heat exchanger in the high pressure branch, working in transcritical regime, allows the de-superheating of the fluid in the gaseous state, without phase change. Therefore, the exchangers must be optimized according to the thermophysical characteristics of the CO2 and in particular, due to the different operating pressures and the different flow, the evaporators and gas coolers of the air/air machines take on different geometries due to the shape and type of the pipes, as well as for the number and length of the circuits (the most in-depth studies derive from the automotive field).

The sizing of the surfaces of the heat exchangers depends on the characteristics of the heat exchange capacity of the refrigerant (CO2). For example, the high pressure side of a CO2 system operates with high temperatures of the refrigerant fluid entering the exchanger, with consequent optimization of the exchange surfaces and reduction of air flow rates.

At the same time, the heat exchange characteristics of the refrigerant fluid make it possible to obtain outlet temperatures to the gas cooler that are very close to those of the air.

Therefore, with the same power exchanged, the gas cooler for CO2 has a smaller surface than that of a condenser for HFC.

In consideration of the technical elements reported, a reversible CO2 circuit should be equipped with a double number of exchangers compared to a traditional circuit.

Many reversible air/air devices for producing hot and cold air are known in the art.

The prior document FR3066808 describes an air conditioning circuit of a motor vehicle and the heat pump management method, comprising:

a central control unit capable of controlling the transition from one operating mode to another.

The prior document FR2983280 refers to a refrigeration circuit and not to an aeraulic one, and describes the operation of a thermodynamic cycle, in particular a conditioning circuit, comprising:

a compressor, an external heat exchanger, a first expansion medium, a second expansion medium, an evaporator, a heat exchanger and control means suitable for configuring the conditioning circuit for various operating modes which include at least a first means interception capable of allowing and/or preventing in whole or in part a circulation of the refrigerant, which means is interposed between the compressor and the external heat exchanger, and at least a second interception means capable of allowing and/or preventing all or part of a refrigerant flow and disposed between the first shut-off means and the compressor. Prior document U.S. Pat. No. 3,995,446 discloses a reversible air conditioner which can be used for cooling or heating by redirecting the air distribution with a single diverter which directs the air through the condenser or evaporator.

Prior document WO2016153371A1 describes a system consisting of two cylinders, equipped with two openings: the relative movement between the external and internal cylinder allows to reverse the air flows.

The prior document U.S. Pat. No. 6,240,735 describes a system capable of directing the flow of air only in two directions.

The main disadvantage of the systems in the aforementioned prior documents concerns the fact that they are reversible air/air devices for the production of hot and cold air, not able to manage the defrosting process.

In addition, the aforementioned systems are devoid of the refrigerant R744, carbon dioxide CO2 and are not equipped with cylindrical shutters that allow multiple switching of the direction of air flows.

There are also known embodiments in which the inversion of the heat pump cycle is obtained by means of shutters or diverters suitable for directing the air flows coming from the inside of the air-conditioned room or from the outside in the direction of the heat exchangers (cit. prior documents: U.S. Pat. Nos. 4,297,853, 4,297,854, 3,995,446, 2,401,560, 4,678,025, KR101939586B1, KR101636263B1), but with a different technical solution from that of the present invention and with the following limits:

i. Impossibility of carrying out the defrosting cycle by using the heat coming from the hot exchanger (an energetically cheaper solution than using electric resistances);

ii. Air flows in non-optimized exchangers: the speed of crossing of the exchangers can vary considerably depending on the distance of the air openings (coming from the air-conditioned room or from the outside);
iii. Presence of constraints in the positions of the delivery and return openings: the present invention easily adapts to the various plant requirements;
iv. High number of dampers and flow deviators with consequent disadvantages:
   a. cost of the actuators;
   b. energy efficiency compromised by the large number of drives;
   c. lower reliability linked to the increase in the number of components;
   d. head losses related to the flow of air inside the shutters.

Object of the present invention is solving the aforementioned prior art problems by means of a device (100), consisting of a heat pump of the reversible air/air type, for the production of hot and cold air, based on a system of cylindrical shutters rotating and having as refrigerant a natural refrigerant gas (R744—carbon dioxide-002), non-toxic and non-flammable.

A further object of the present invention is the realization of an air conditioning/heating unit which, thanks to the principle of the heat pump, allows to reduce electrical consumption by up to 80% compared to a system of similar power consisting of electric heating resistances (typically employed in the railway field.

This invention complies with the current regulation on greenhouse gases (Regulation (EU) No. 517/2014) which directs the choices of refrigerants towards natural ones (hydrocarbons and CO2) and at the same time guarantees the operational safety required in certain areas where there are restrictions on the use of flammable refrigerants (HFO, and HC): especially in the railway and naval sectors, and in all applications in which a loss of refrigerant in the pressurized refrigerant circuit would involve a risk for the safety of residents.

The effect of the F-Gas Regulation on the Heating, Ventilation and Air Conditioning (HVAC & R) industry is the gradual disappearance of high GWP hydrofluorocarbons (HFCs) with the consequent diffusion of refrigerants with very low GWP, including natural refrigerants, such as CO2, hydrocarbons and HFOs (Hydro-Fluoro-Olefins); in particular HFOs, initially used in the transport sector, have been gradually abandoned due to limitations due to partial flammability, while R744 represents a valid alternative as it is a low impact solution in terms of GWP and is not affected The present invention also allows obtaining a benefit in economic and reliability terms linked to the simplification of the refrigeration circuit compared to the solution with inversion on the refrigeration circuit (case of transcritical CO2 systems).

The present invention, therefore, overall overcomes the constraints listed above, and has the purpose of making it possible to create an air conditioning/heating unit with high efficiency, low environmental impact and economic sustainability, in order to allow the diffusion of such equipment in various areas, such as: the air conditioning of rolling stock, cruise ships, industrial and commercial environments.

The aforesaid and other objects and advantages of the invention, as will emerge from the following description, are achieved with a reversible device for the production of hot and cold air, such as the one described in claim 1. Preferred embodiments and non-trivial variants of the present invention form the subject of the dependent claims.

Preferred embodiments and non-trivial variants of the present invention form the subject of the dependent claims.

It is understood that all attached claims form an integral part of the present description.

It will be immediately obvious that innumerable variations and modifications (for example relating to shape, dimensions, arrangements and parts with equivalent functionality) can be made to what is described without departing from the scope of the invention as appears from the attached claims.

The present invention will be better described by some preferred embodiments, provided by way of non-limiting example, with reference to the attached drawings, in which.

Figure 1:
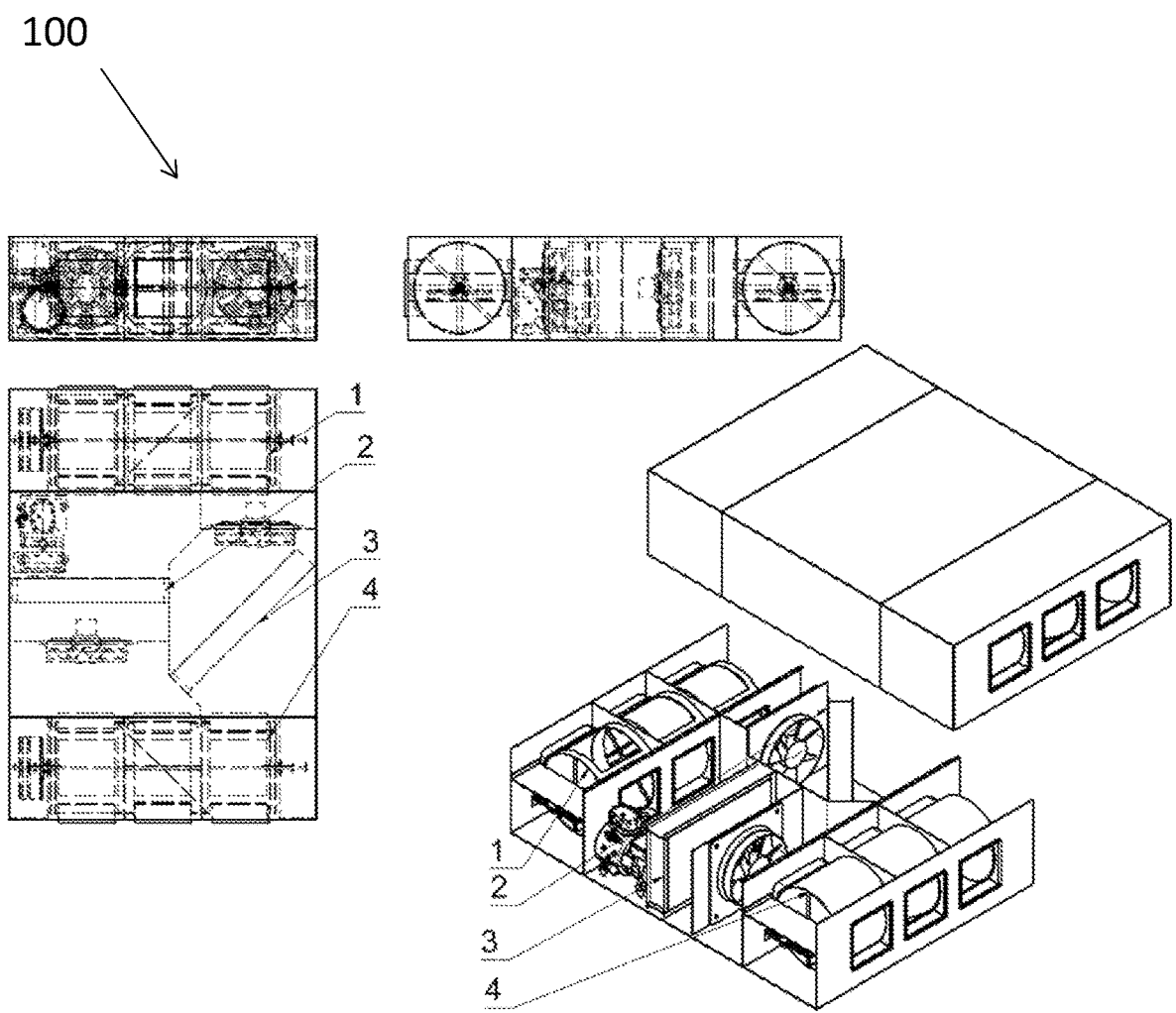
FIG. 1 shows an exemplary drawing of the reversible device (100) for the production of hot and cold air, according to the present invention.
Figure 2:
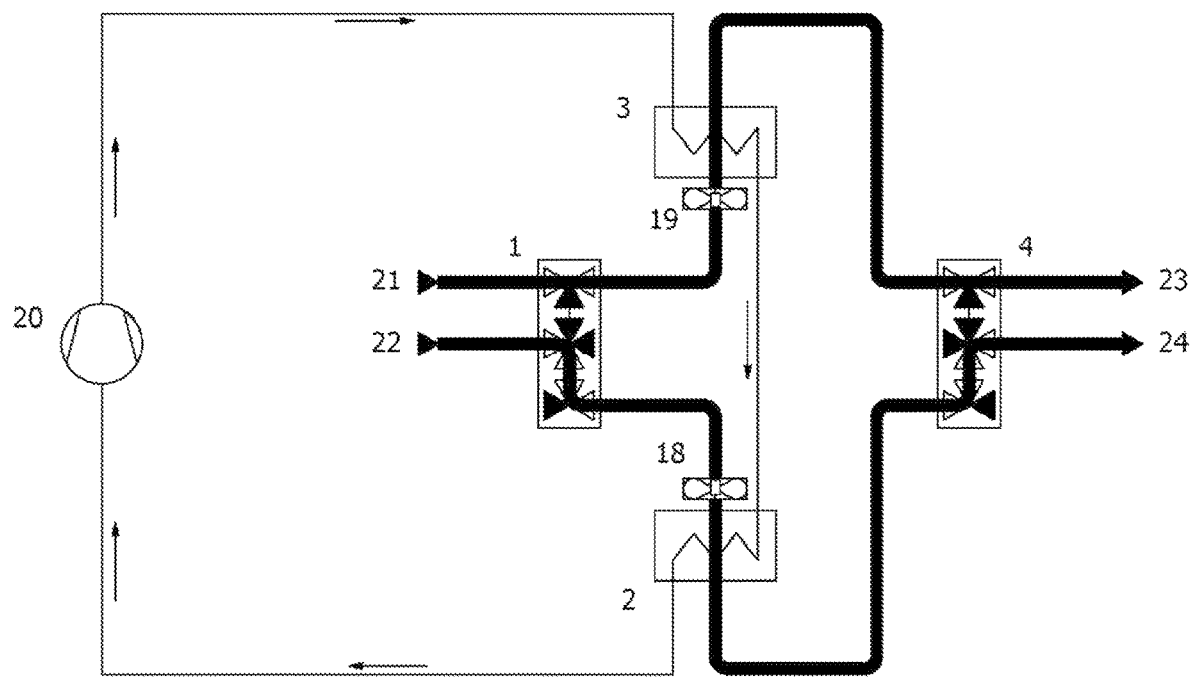
FIG. 2 shows the general operating diagram of the reversible CO2 refrigeration circuit by means of a suitable system of cylindrical shutters according to the present invention.
Figure 3:
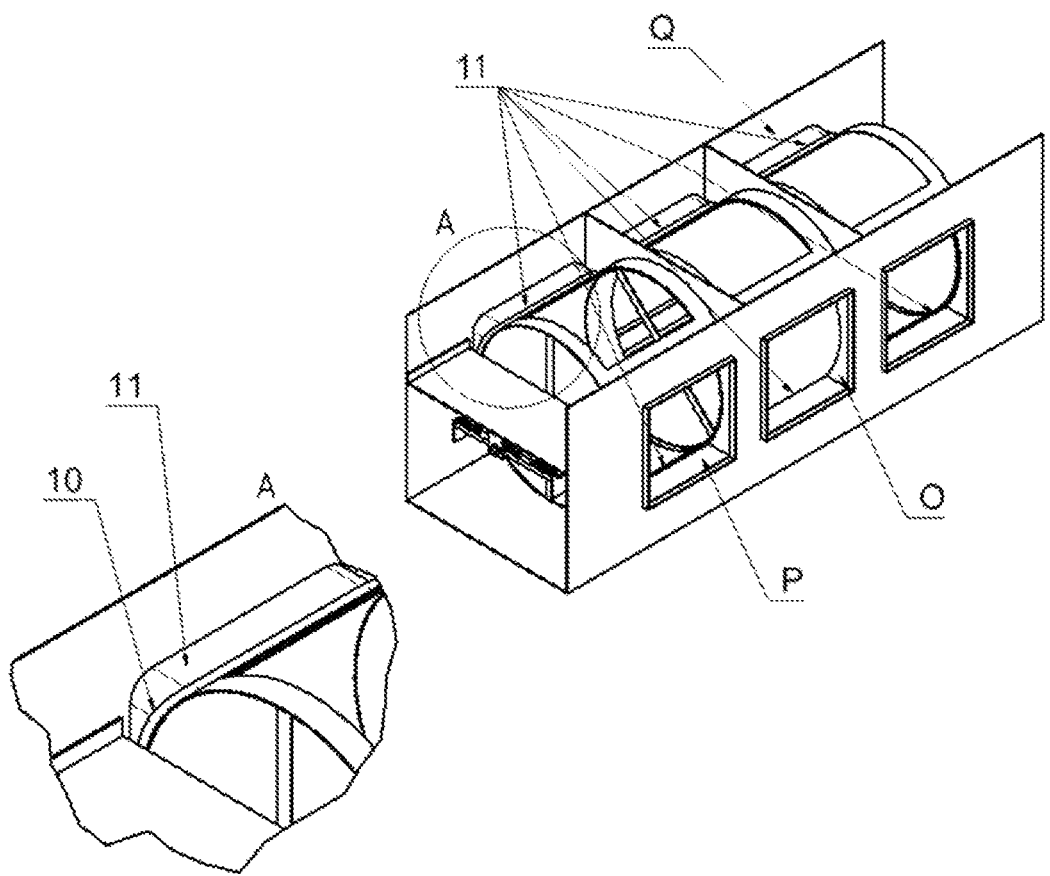
FIG. 3 shows an exemplary drawing of the air sealing systems of the plenum (0) of the device (100) according to the present invention.
Figure 4:
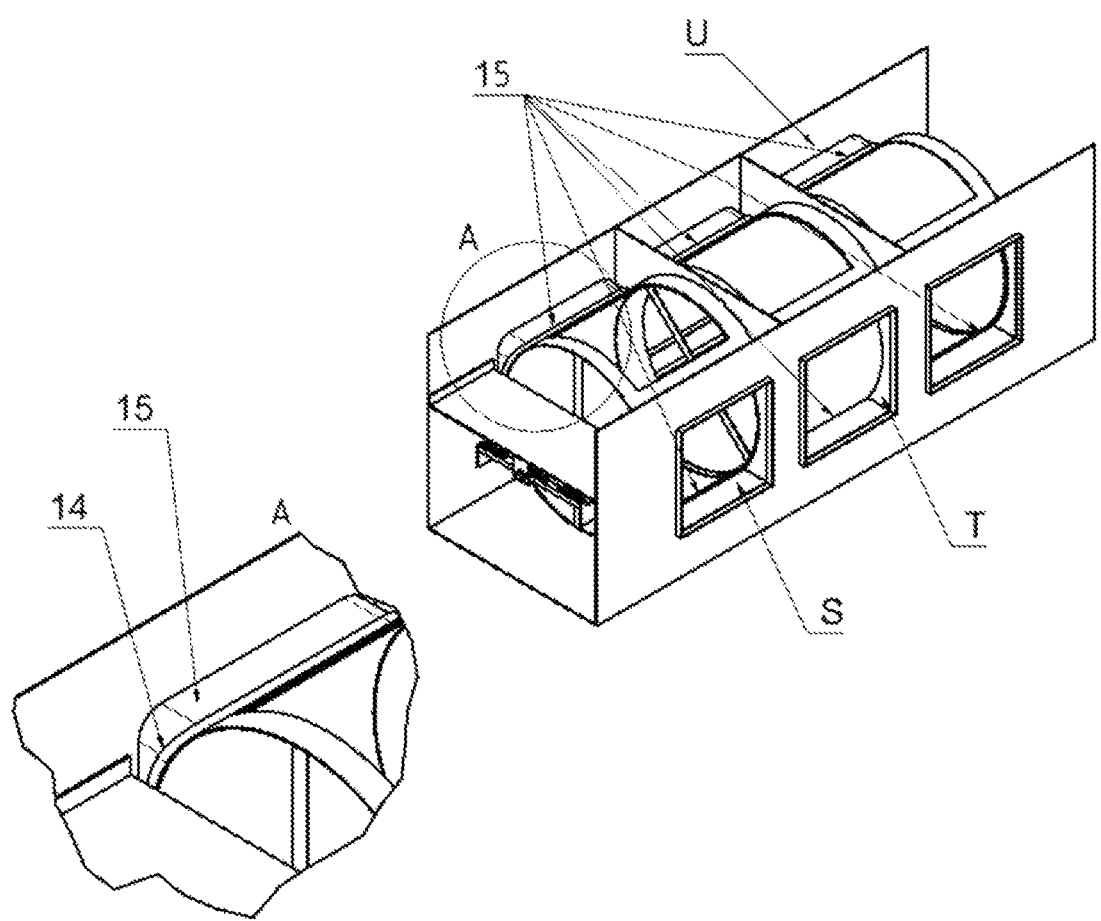
FIG. 4 shows an exemplary drawing of the air sealing systems of the plenum (T) of the device (100) according to the present invention.
Figure 5:
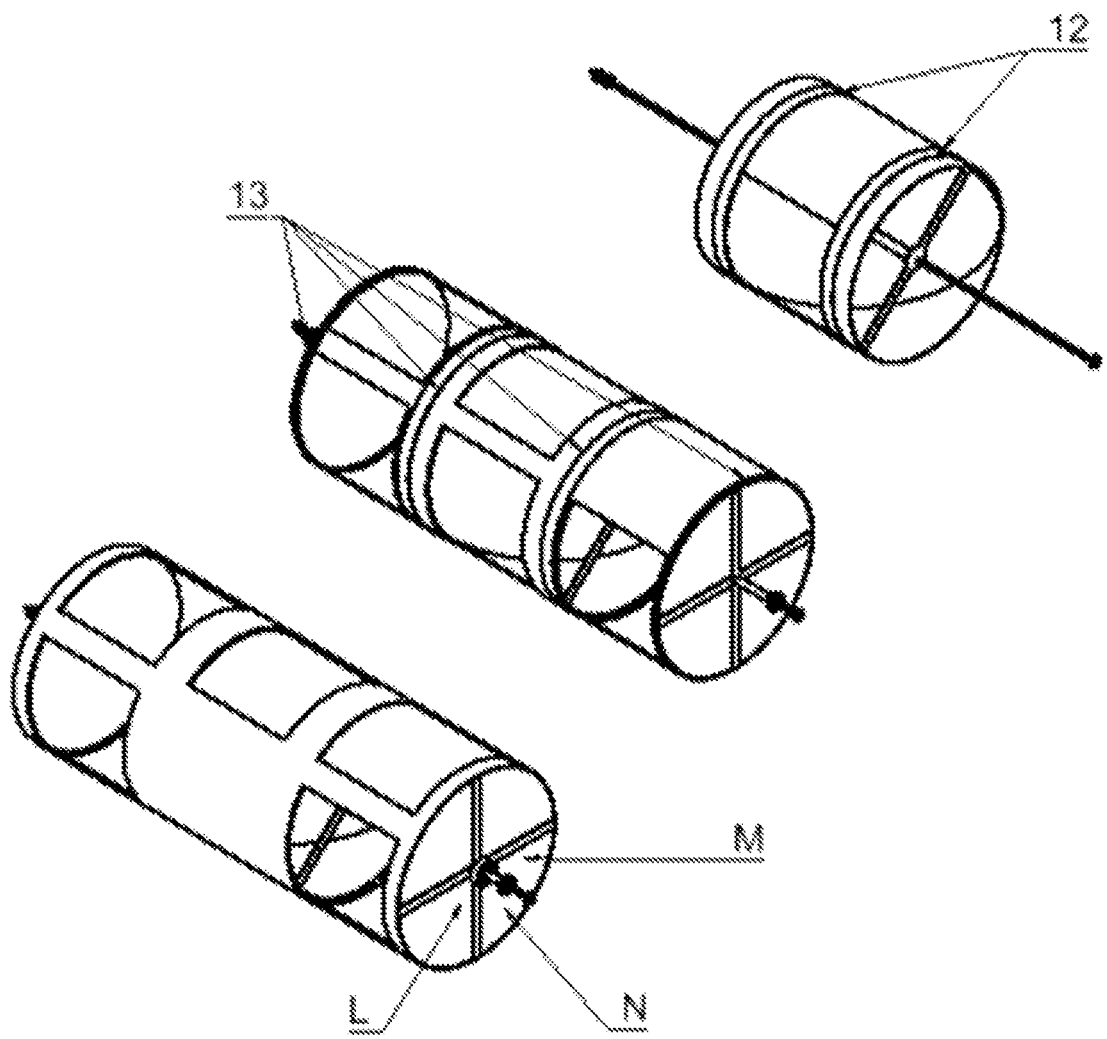
FIG. 5 shows an exemplary drawing of the means for reducing friction and for rotating the shaft (L) of the device (100) according to the present invention.
Figure 6:
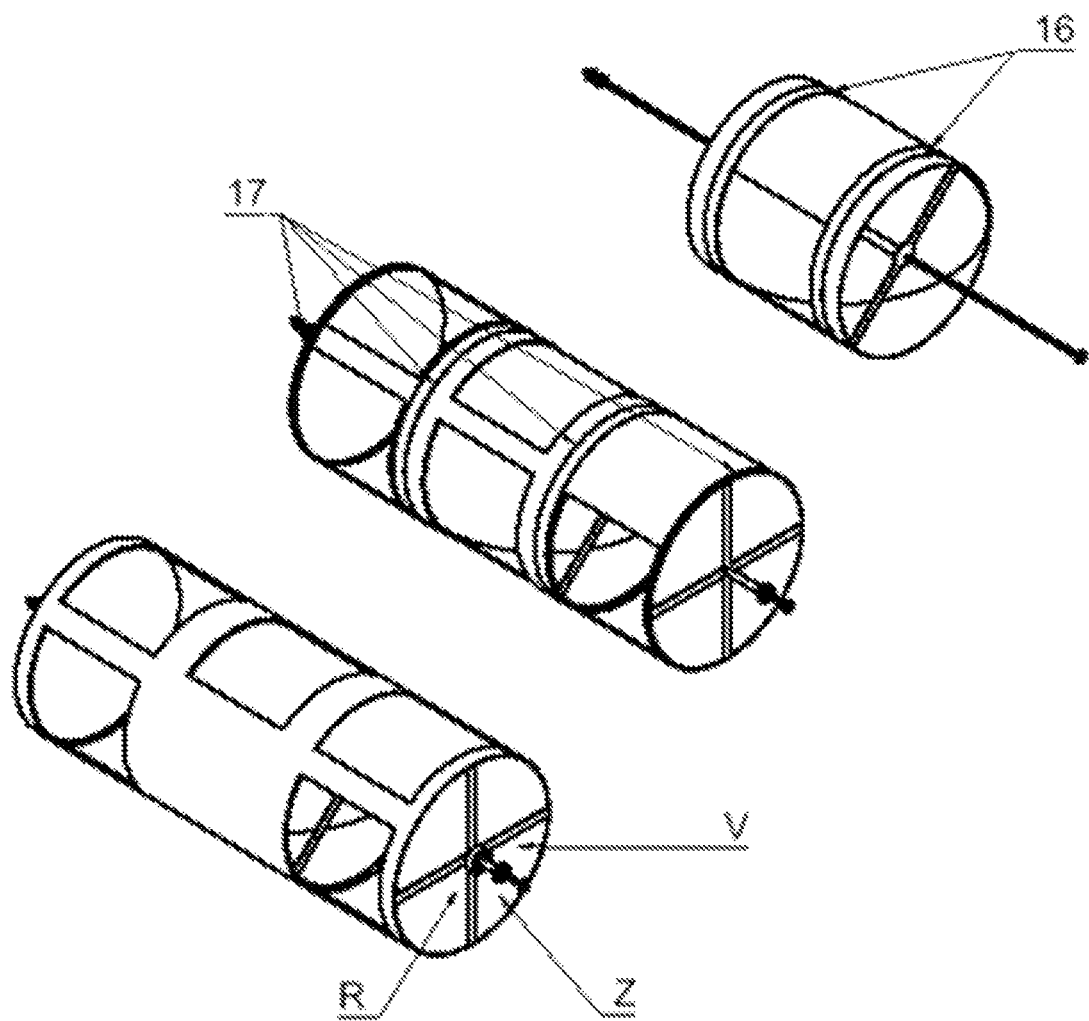
FIG. 6 shows an exemplary drawing of the means for reducing friction and for rotating the shaft (R) of the device (100) according to the present invention.
Figure 7:
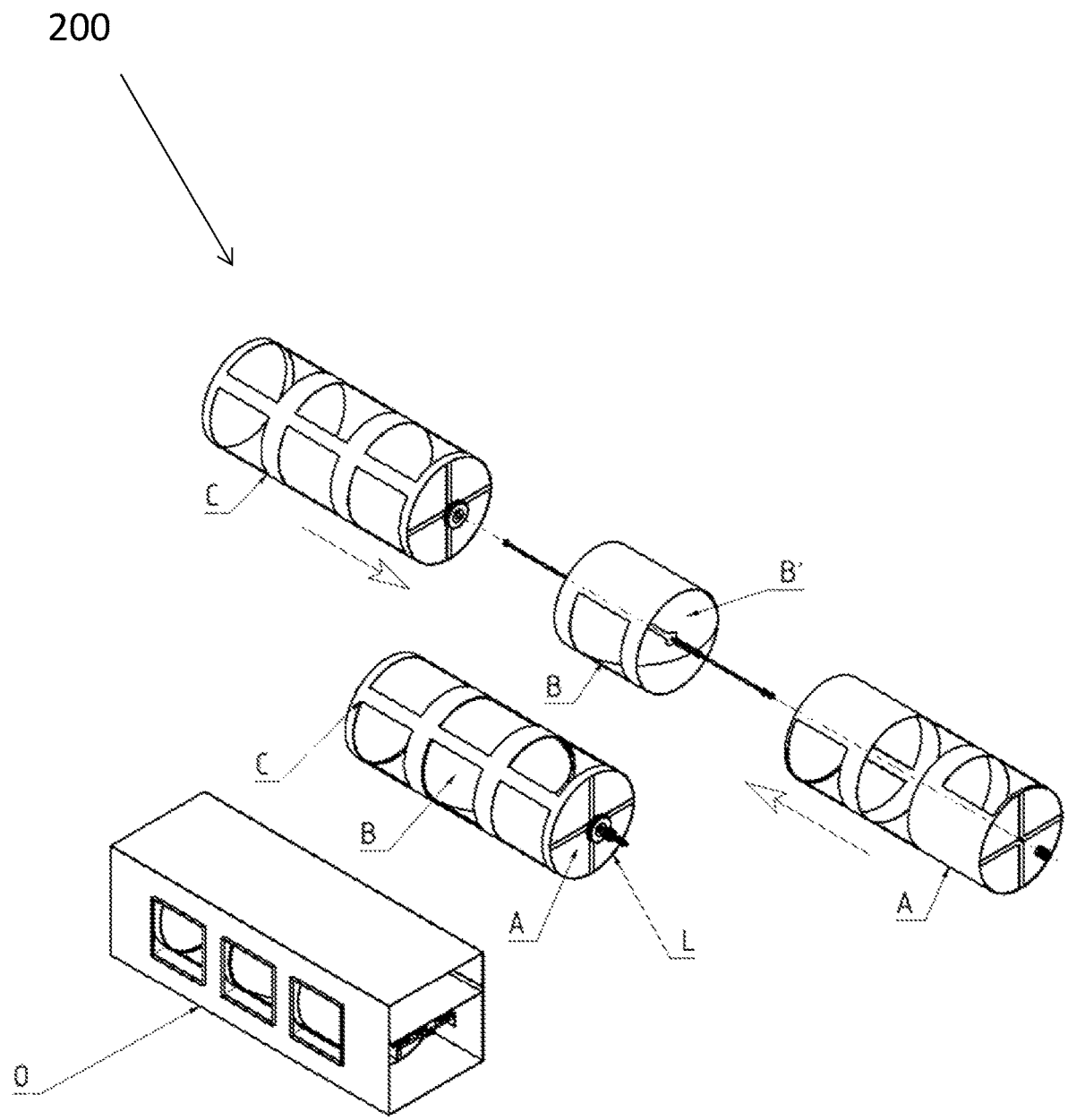
FIG. 7 shows an exemplary drawing of the suction damper system of the device (100) according to the present invention.
Figure 8:
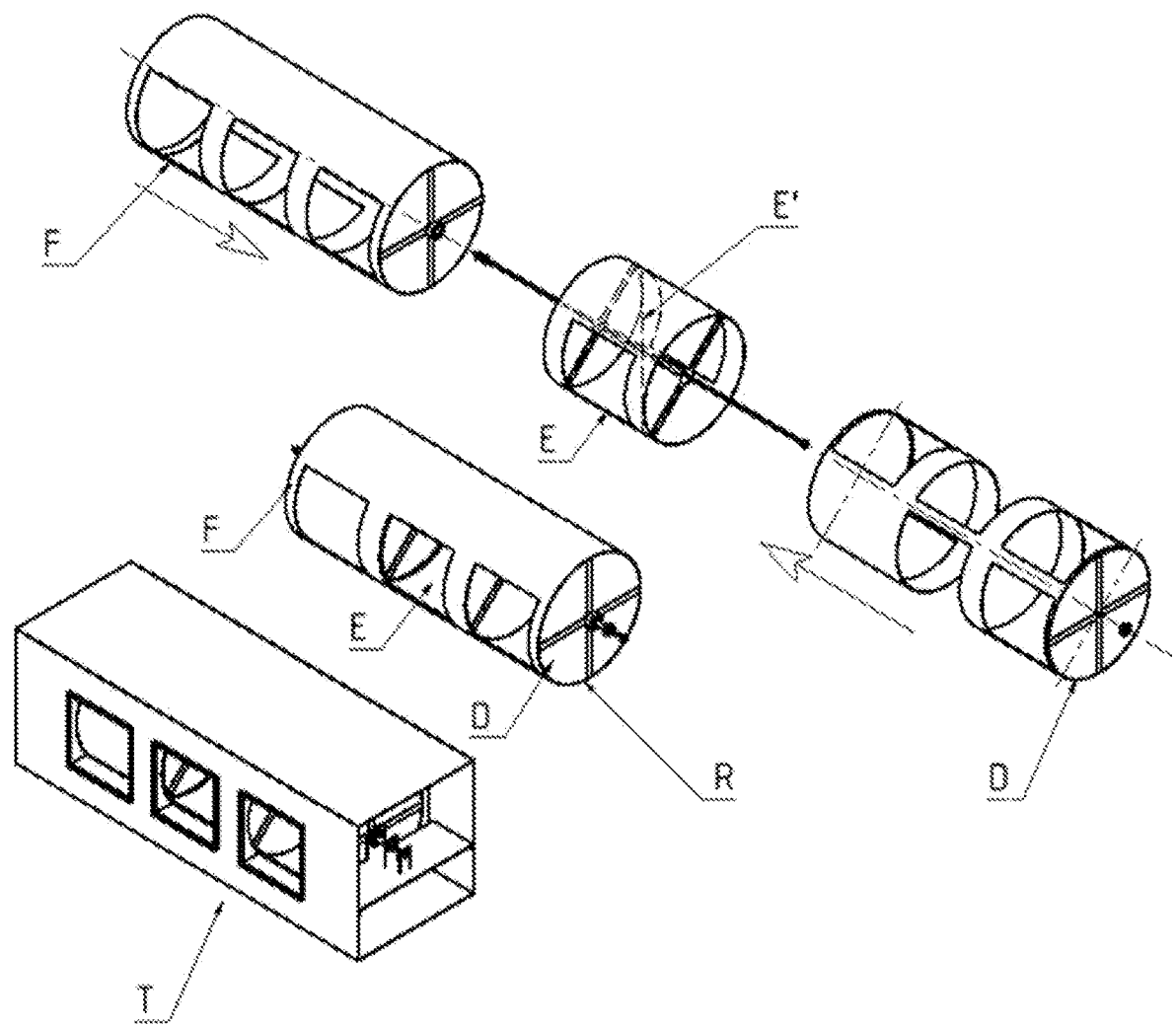
FIG. 8 shows an exemplary drawing of the delivery damper system of the device (100) according to the present invention.
Figure 9:
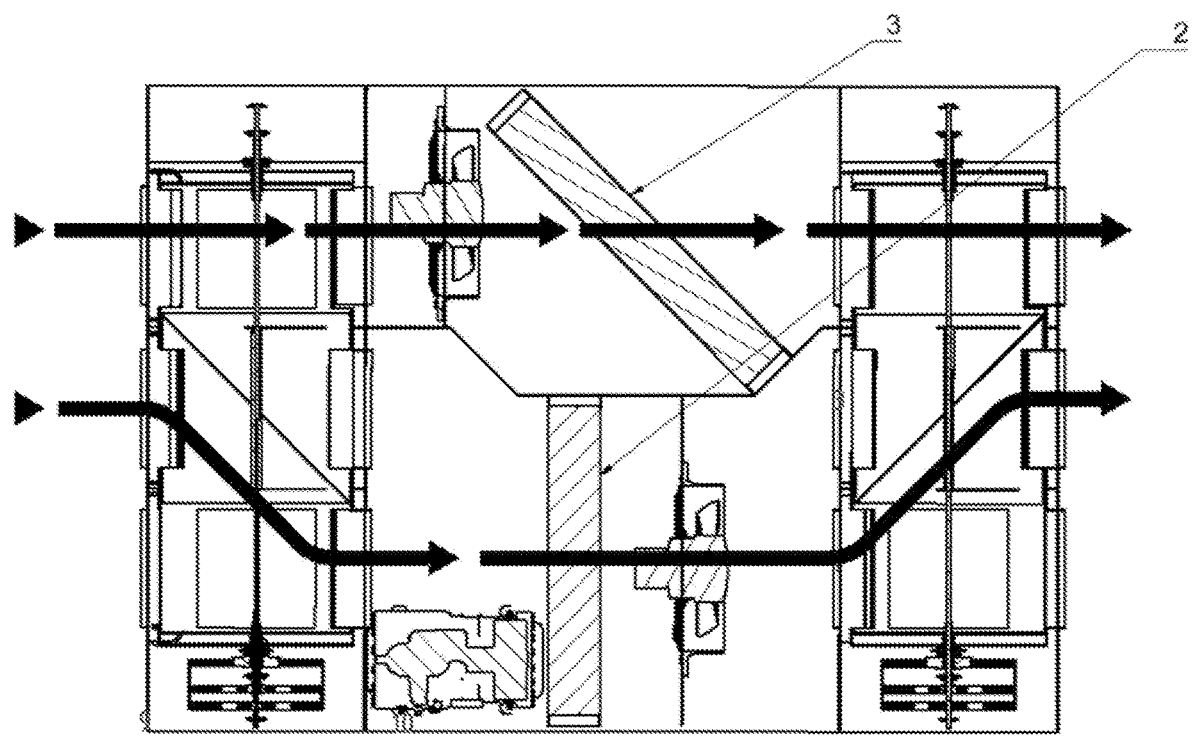
FIG. 9 shows the functional diagram of the device (100) in cooling mode according to the present invention.
Figure 10:
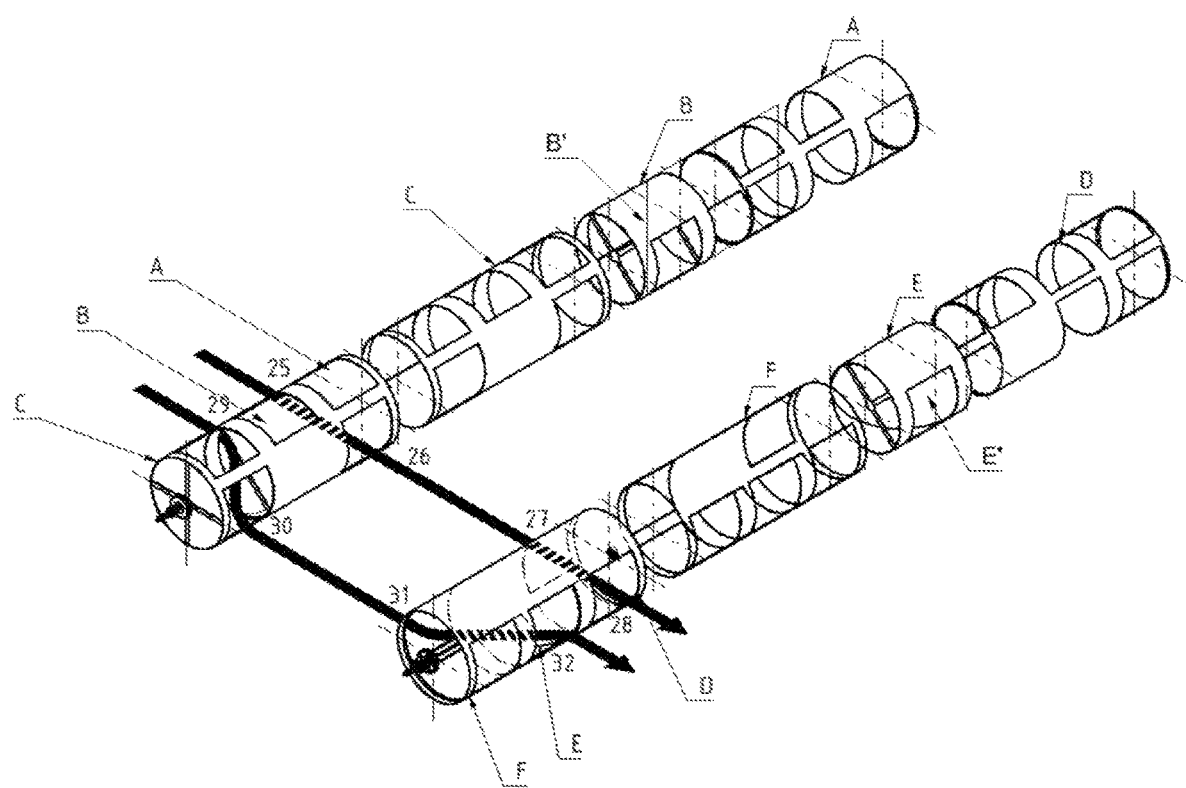
FIG. 10 shows an exemplary drawing of the configuration of the cylinders of the suction and delivery dampers of the device (100) in cooling mode according to the present invention.
Figure 11:
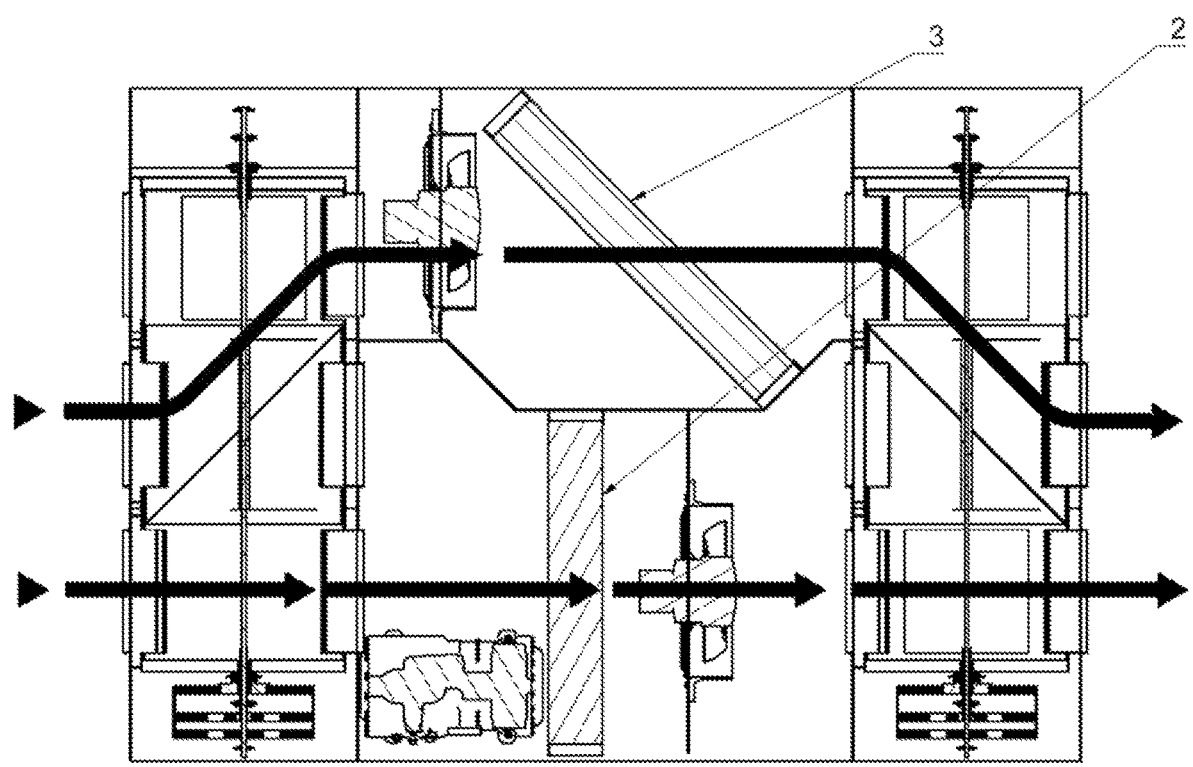
FIG. 11 shows the functional diagram of the device (100) in heating mode according to the present invention.
Figure 12:
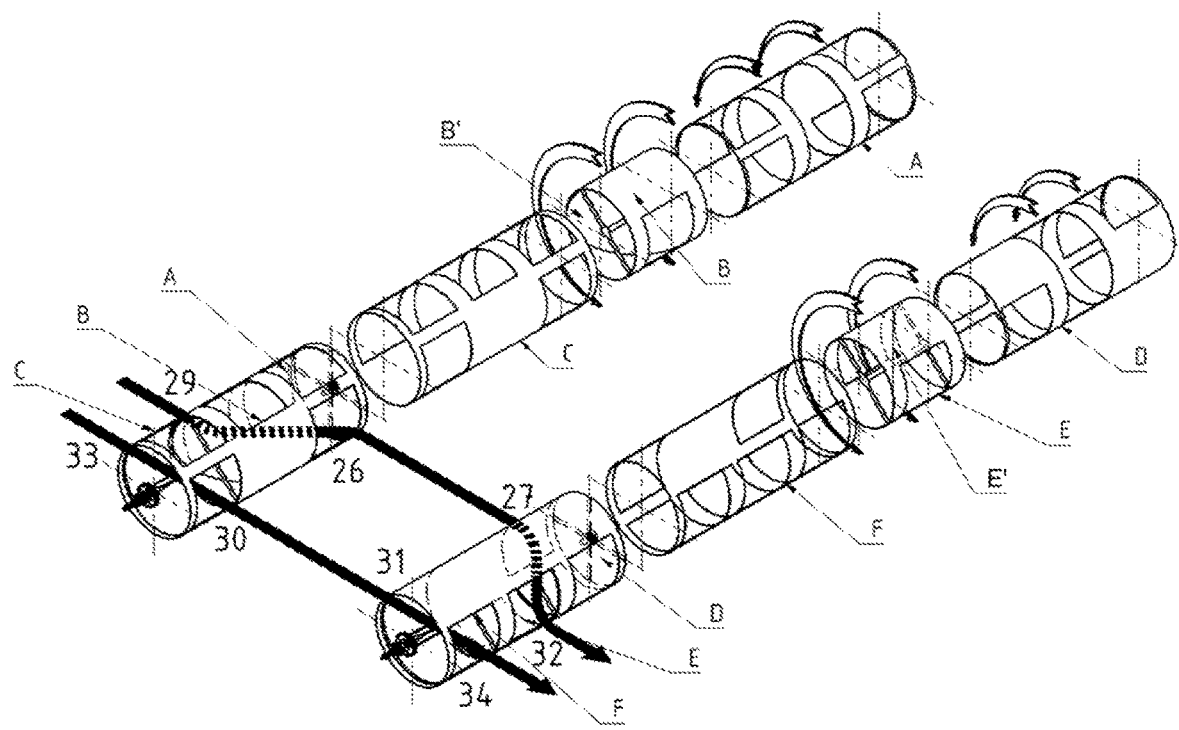
FIG. 12 shows an exemplary drawing of the configuration of the cylinders of the suction and delivery dampers of the device (100) in heating mode according to the present invention.
Figure 13:
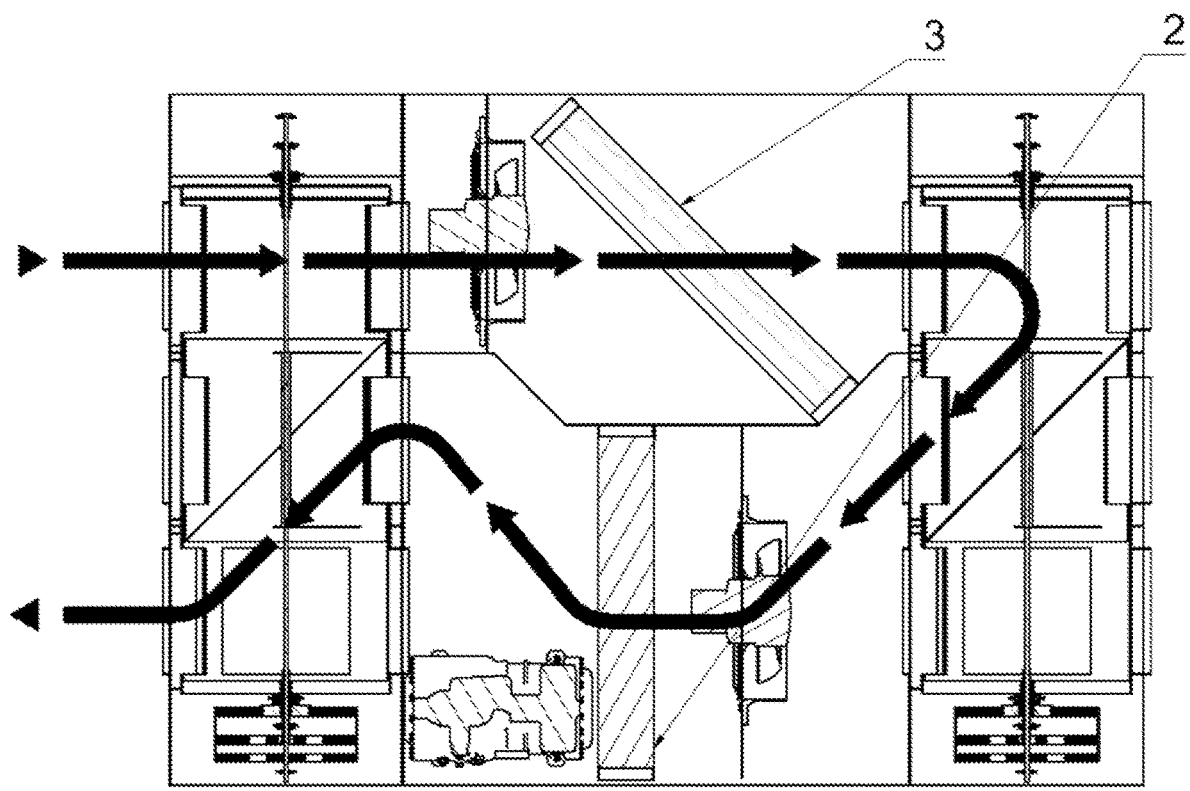
FIG. 13 shows the functional diagram of the device (100) in the first variant of defrosting according to the present invention.
Figure 14:
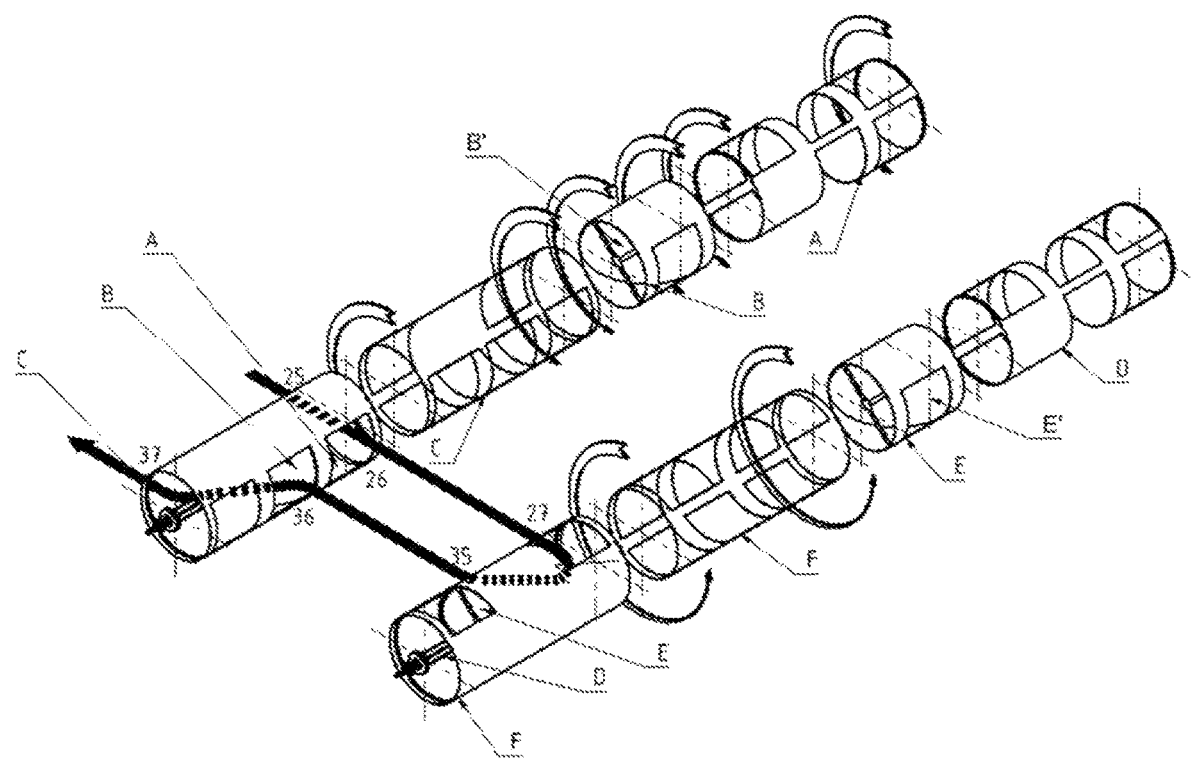
FIG. 14 shows an exemplary drawing of the configuration of the cylinders of the suction and delivery dampers of the device (100) in the first variant of defrost according to the present invention.
Figure 15:
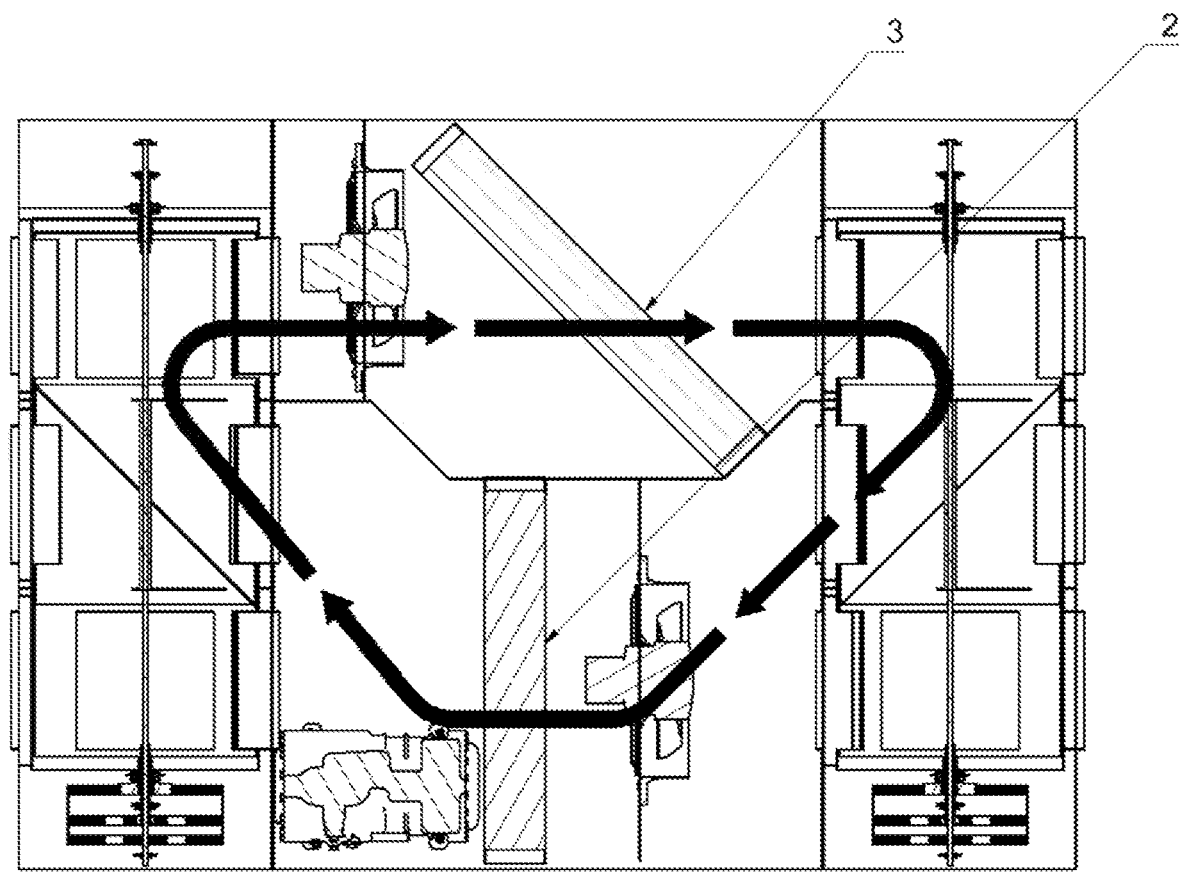
FIG. 15 shows the functional diagram of the device (100) in the second variant of defrosting according to the present invention.
Figure 16:
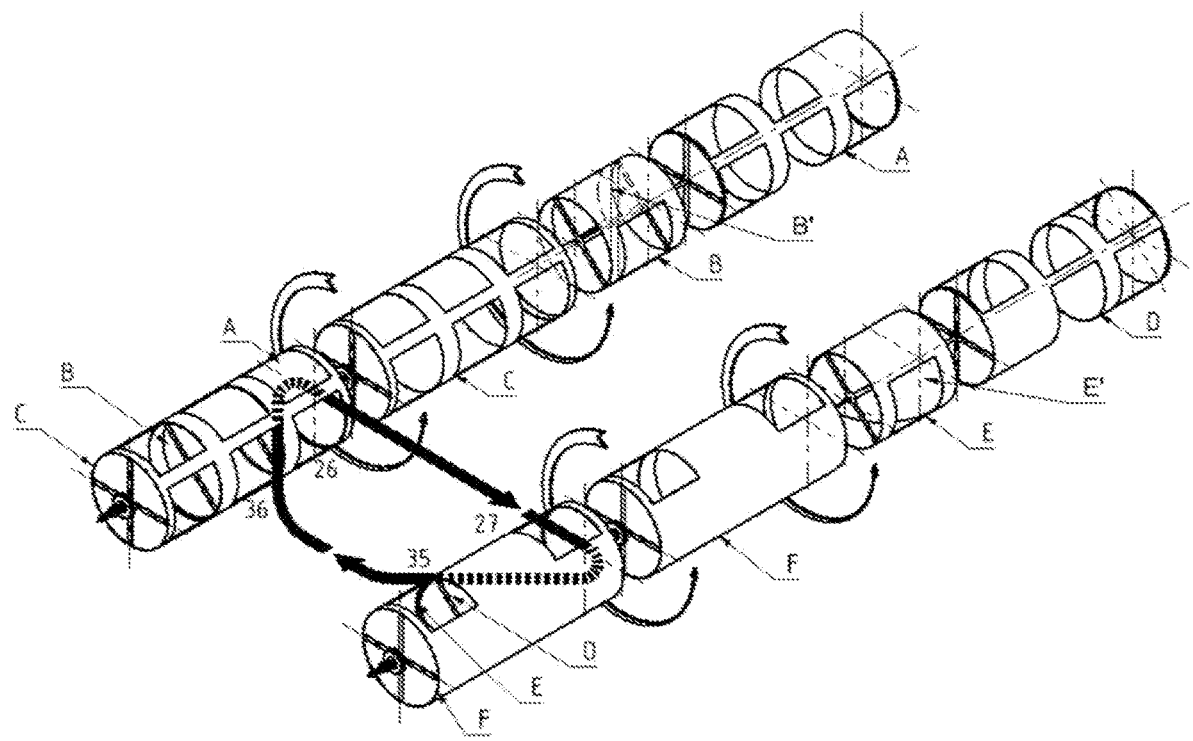
FIG. 16 shows an exemplary drawing of the configuration of the cylinders of the suction and delivery dampers of the device (100) in the second variant of defrosting according to the present invention.
Figure 17:
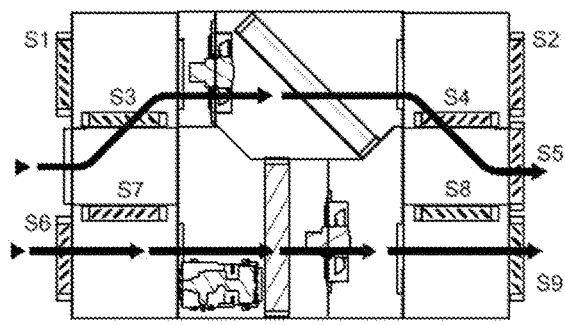
FIG. 17 shows an exemplary drawing of a possible configuration in heating (A) and in cooling (B) in the inversion of the cycle of the air/air units of the device (100) according to the present invention.
Figure 17:
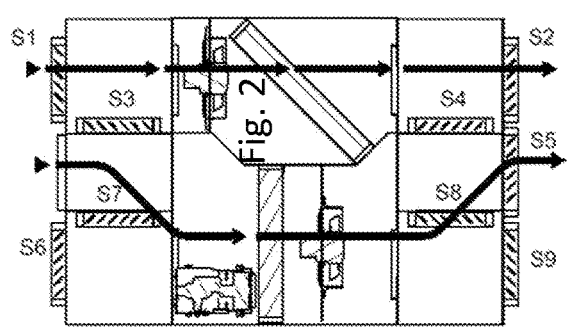
Figure 18:
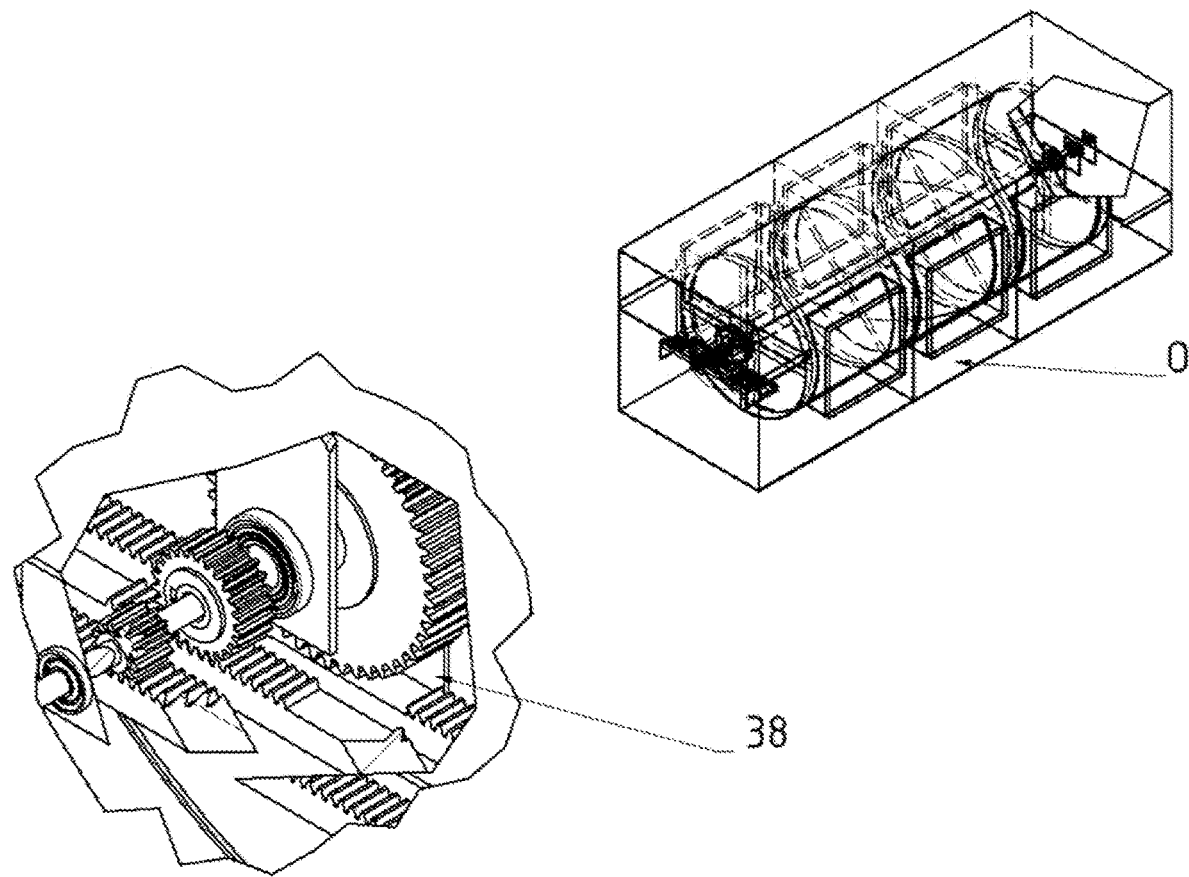
FIG. 18 shows an exemplary drawing of the actuators present in the shafts of the cylinders and in the plenums of the device (100) according to the present invention.
Figure 19:
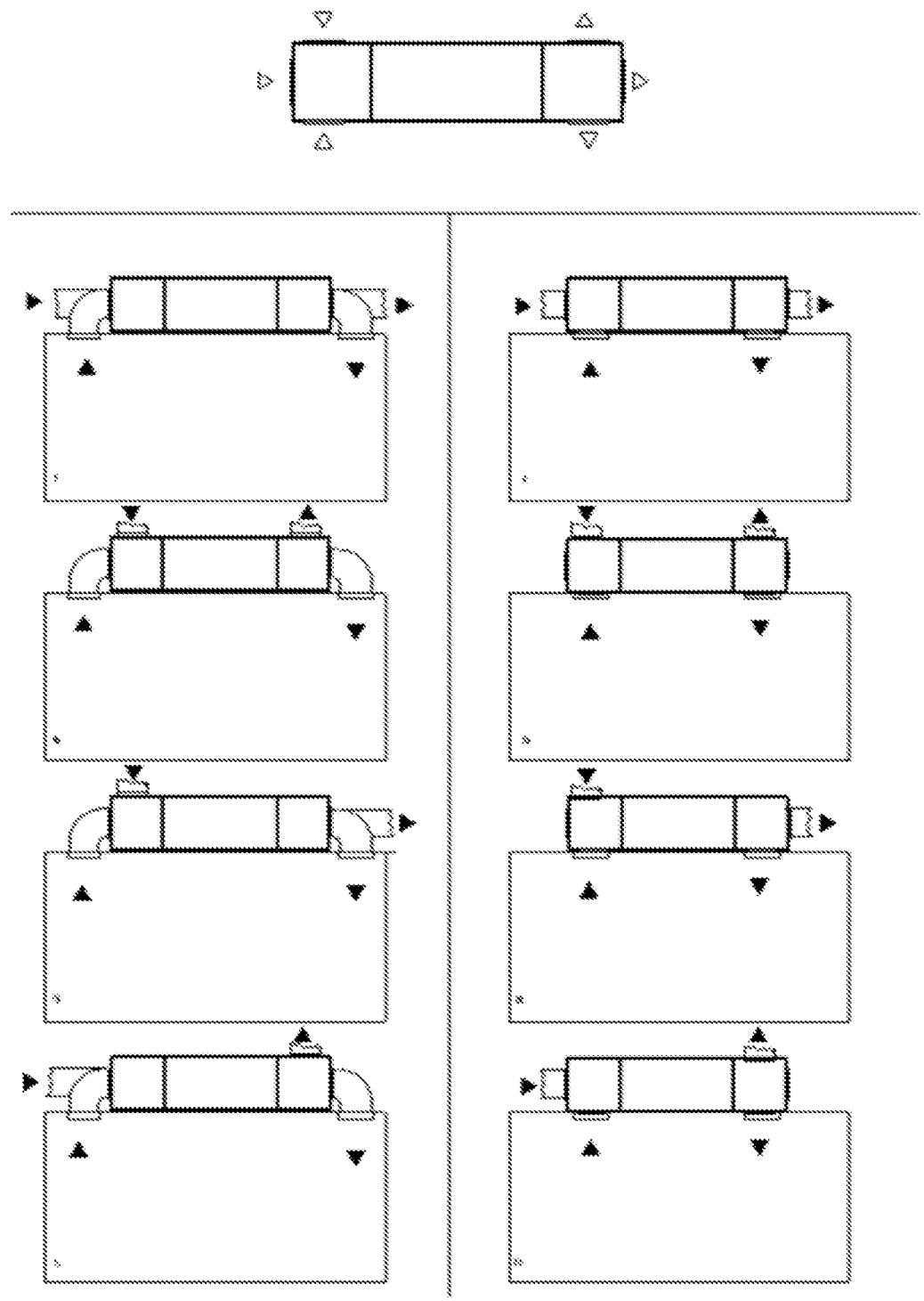
FIG. 19 shows an exemplary drawing of the implementable aeraulic ducts of the device (100) according to the present invention.
Figure 20:
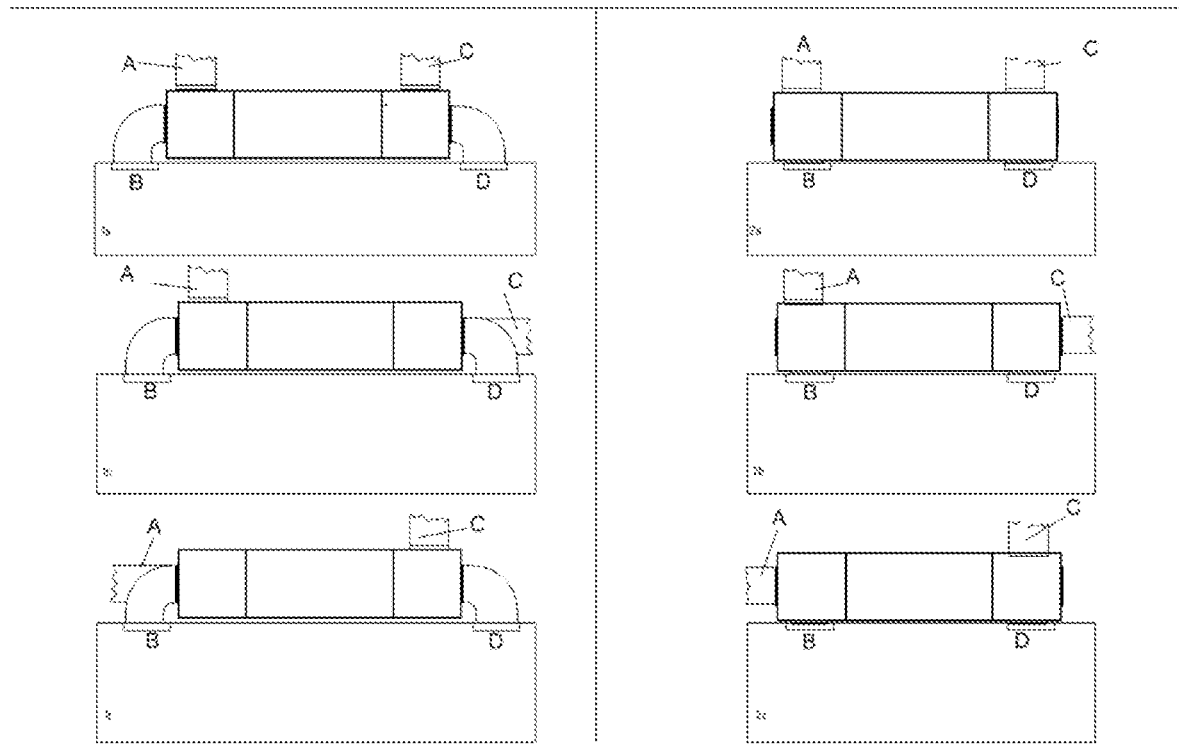
FIG. 20 shows a variant of the exemplary drawing of the aeraulic ducts that can be implemented of the device (100) according to the present invention.

The reversible device (100) for the production of hot and cold air has as its refrigerant the natural refrigerant gas R744, carbon dioxide 002, non-toxic and non-flammable and is based on a system of rotating cylindrical shutters.

The device object of the present invention is composed of a system of suction dampers (1) consisting of cylinders (A, B, C) and designed to implement the reversibility of the operation between heating and cooling (2), a refrigerant circuit comprising: one cold exchanger (2) and a hot exchanger (3) located between the intake damper system (1) and the delivery damper system (4) consisting of cylinders (D, E, F) also designed to implement the reversibility of operation in a manner consistent with the suction damper system (1).

Advantageously, the reversible device (100) for the production of hot and cold air is designed to use a refrigerant fluid inside a refrigerant circuit consisting of a cold exchanger (2) and a hot exchanger (3) a natural refrigerant gas R744, carbon dioxide CO2, non-toxic and non-flammable.

The aforementioned R744 refrigerant gas represents an ecological and efficient alternative to fluorinated refrigerants since it does not contribute to the reduction of the ozone layer, has a lower impact than other refrigerants on the greenhouse effect and also has a high cooling power; in particular, the F-Gas Regulation of 2014 requires the "phase out" of refrigerants with a high GWP coefficient which indicates to what extent a gas is able to heat the atmosphere; this parameter for CO2 is equal to 1.

The cylinders (A, B, C, D, E, F) of the intake (1) and delivery (4) dampers are suitably provided with openings in the shell through which it is possible to manage the circulation of the air flow; in addition, the cylinders (B, E) are equipped with keyed baffles (B', E') to divert the air flow; in particular the cylinders (A, B, C) and the keyed septum (B') and the cylinders (D, E, F) and the keyed septum (E') are connected respectively to the shafts (L) and (R) equipped with ends of means for reducing friction (M) and (V) such as for example ball and/or roller and/or magnetic bearings and for allowing their rotation (N) and (Z).

Further, the cylinders (A, B, C) and the keyed septum (B') and the cylinders (D, E, F) and the keyed septum (E'), the shafts (L) and (R) and the means for friction reduction (M, V, N, Z) to allow their rotation are connected respectively to the plenum (O) and to the plenum (T) which are advantageously provided with openings both on the sides (P) and (S) in correspondence of the external air and internal air channels, which from the sides (Q) and (U) correspond to the cold (2) and hot (3) exchanger; in particular the plenums (0, T) are equipped with air sealing systems (10) and (14) such as: gaskets in different materials, for example plastic and/or metal and/or elastic, between the cylinder and the air passage opening (11,15) in correspondence of the openings (P, Q) and (S, U), and between the internal cylinders and the intermediate cylinders (12, 16) and between the intermediate and external cylinders (13, 17).

The reversible device (100) according to the present invention is provided with a refrigeration circuit comprising a cold exchanger (2) crossed by the air flow moved by a fan (18) dedicated to this exchanger, and a hot exchanger (3) crossed by the air flow moved by a fan (19) dedicated to this hot exchanger (3), said cold (2) and hot (3) exchangers are connected to the compressor (20) by means of refrigerant pipes and said suction dampers (1) and (4) are motorized by means of one or more actuators (38).

When the device operates in heating mode, ice may form on the finned surfaces of the cold exchanger (2), especially in certain conditions of temperature and relative humidity of the outside air.

The formation of ice leads to a decline in the thermal exchange performance of the cold exchanger (2), with consequent lowering of the refrigerant pressure in the suction branch of the compressor, causing the progressive decrease of the COP and the shutdown of the unit due to the intervention of the protections low pressure installed in the refrigerant circuit.

In traditional heat pumps, in order to eliminate the ice formed, the refrigeration cycle is reversed so that the exchanger in contact with the outside air is crossed by a flow of high-temperature refrigerant that produces defrosting; however, this technique presents problems if applied to refrigeration circuits that use CO2 refrigerant in the transcritical cycle.

For this reason, the reversible device (100) object of the present invention provides for the defrosting phase to be carried out by means of an advantageous direction of the flows, using the hot air generated through the hot exchanger (3).

In particular, the refrigeration circuit generates a heating (21-23) or cooling (22-24) air flow based on the position of the cylinders (A, B, C, D, E, F) and this makes it possible four distinct modes of operation based on the configurations of the air flows, i.e. based on the combinations of the positions of the ports of the cylinders of the intake (1) and delivery (4) dampers, including:

Cooling: in this mode the air flow directed to the user is diverted inside the cold exchanger (2) by opening the ports (29, 30, 31, 32) of the cylinders of the intake dampers (1) and (4), while the air flow coming from the outside is diverted inside the hot exchanger (3) by opening the ports (25, 26, 27, 28) of the cylinders of the intake dampers (1) and delivery (4), and therefore towards the outside; in particular, the keyed septum (B') of the intake damper cylinders deflects the air in a certain direction with respect to the flow (for example: to the right or to the left).

Heating: in this configuration the cylinders (A) and (D) rotate (for example at 90° counterclockwise) with respect to the position of the cooling mode, the cylinders (B, E) rotate (for example at 180° in the counterclockwise) with respect to the position to the position of the cooling mode, the cylinders (C, F) do not rotate with respect to the position of the cooling mode and the air flow from the conditioned environment is diverted towards the hot exchanger (3) by opening of the ports (29, 26, 27, 32) of the cylinders of the suction (1) and delivery (4) dampers, while the air flow coming from the outside is diverted towards the cold exchanger (2) by opening the ports (33, 30, 31, 34) of the cylinders of the suction (1) and delivery (4) dampers.

First variant defrost: in this mode the air is taken from the external environment, the cylinders (A), (B) and (C) rotate (for example at 180° counterclockwise) with respect to the cooling position, the cylinders (D) and (E) remain stationary, the cylinder (F) rotates (for example at 270° counterclockwise) with respect to the cooling position, and the air flow from the outside is diverted towards the hot exchanger (3) and then towards the cold exchanger (2) by opening the ports (25, 26, 27) and (35, 36, 37) of the suction (1) and delivery (4) damper cylinders.

Second variant defrost: in this mode the air is not taken from the external environment, the cylinders (A, B, D, E) are in the cooling mode position, the cylinders (C) and (F) rotate (e.g. example of 270° counterclockwise) with respect to the cooling position, and the air flow is diverted towards the hot exchanger (3) and then towards the cold exchanger (2) by opening the ports (26, 27) and (35, 36) of the cylinders of the intake (1) and delivery (4) dampers.

In particular, in the first and second defrosting variants, the fan (18) of the cold exchanger (2) is off, and the cold air is not sent into the delivery duct to avoid discomfort for the residents.

The reversible device (100) according to the present invention can be replicated at an industrial level in different types of air/air heat pumps, intended for various application areas, among which the following can be identified:
  "stand alone" monobloc heat pumps typical of railway air conditioning;
  "stand alone" monobloc heat pumps of the roof top type typical of air conditioning for industrial and commercial environments;
  ductable monobloc heat pumps used in the air conditioning of small rooms or in naval applications;
  split heat pumps, typically used in the air conditioning of small rooms, hotel air conditioning, bus air conditioning;
  "split" heat pumps typical of the air conditioning of small rooms, hotel air conditioning and naval applications.

The present invention provides for a further construction variant that finds application where the spaces available for installation are particularly limited (example of a railway vehicle).

This variant provides for the installation of an external unit on which the compressor of the refrigeration circuit is housed and an air handling unit which includes the heat exchangers and the system of deviating dampers suitable for reversing the operation between heating and cooling.

Figure 21:
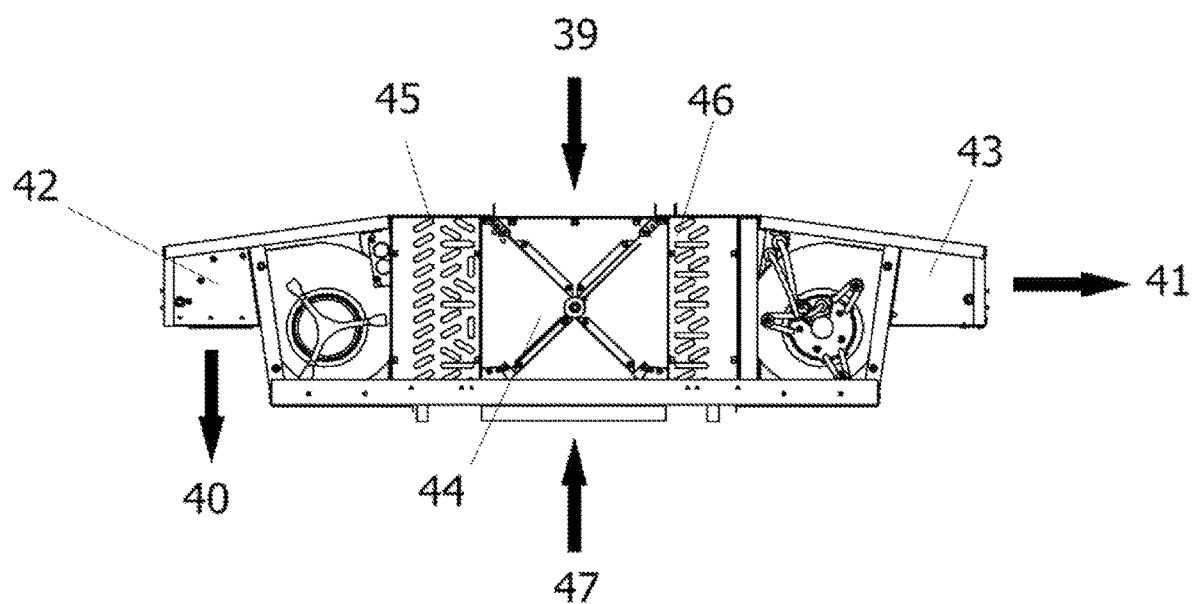
FIGS. 21 and 22 show a further variant of the device according to the present invention.

FIG. 21 shows the cooling configuration: the flow of air (47) coming from the air-conditioned environment is diverted by means of the damper (44) towards the cold exchanger (45), sucked in by the fan unit and diverted by the damper (42) in the delivery duct (40) to the air-conditioned environment. The flow of air (39) coming from the outside is diverted by means of the damper (44) towards the hot exchanger (46) and subsequently expelled (41) into the external environment by means of the damper (43).

Figure 22:
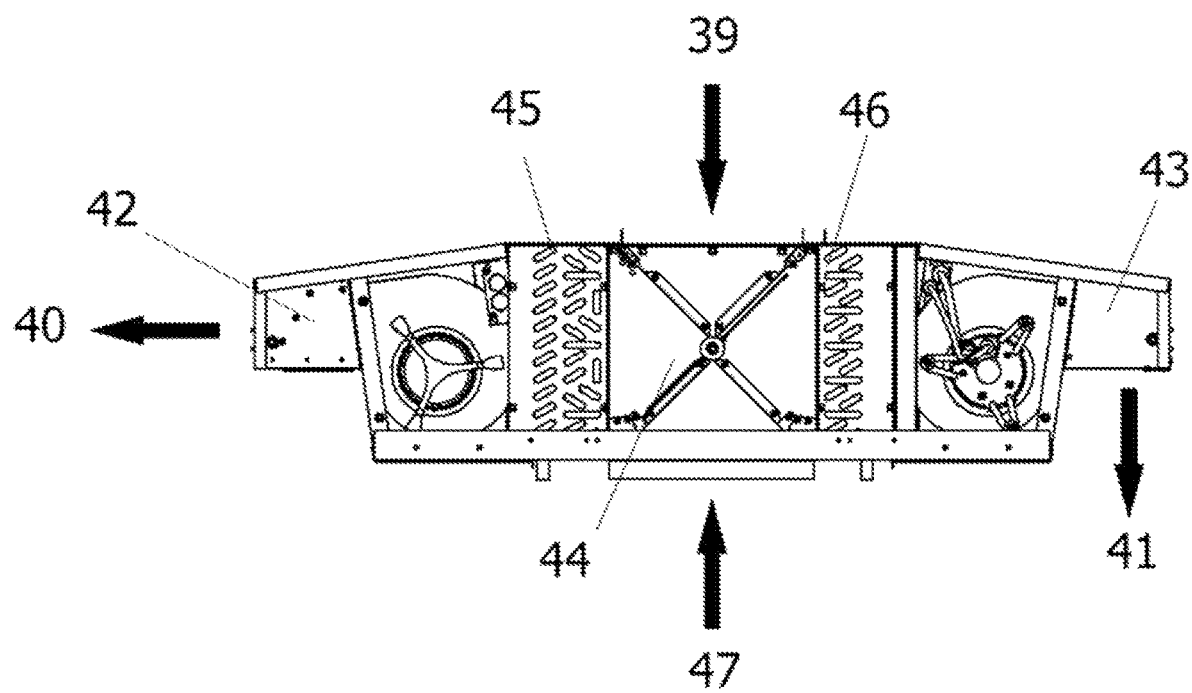

FIG. 22 shows the configuration in heating mode: the air flow (47) coming from the conditioned environment is diverted by means of the damper (44) towards the hot exchanger (46), sucked in by the fan unit and diverted by the damper (43) in the delivery duct (41) to the air-conditioned environment. The flow of air (39) coming from the outside is diverted by means of the damper (44) towards the cold exchanger (45) and subsequently expelled (40) into the external environment by means of the damper (42).

The invention claimed is:

1. A reversible heat pump device (100) by means of appropriate direction of air flows, with R744 refrigerant for producing hot and cold air, including:
  a system of intake dampers (1) consisting of concentric cylinders (A, B, C), equipped with suitable openings and designed to implement a reversibility between a heating operation and a cooling operation;
  a refrigeration circuit comprising a cold exchanger (2) and a hot exchanger (3) located between the system of intake dampers (1) and a delivery damper system (4);
  the delivery damper system (4) consisting of concentric cylinders (D, E, F) equipped with suitable openings and designed to implement the reversibility between the heating operation and the cooling operation in a manner consistent with the system of intake dampers (1).

2. The reversible heat pump device (100) for the production of hot and cold air according to claim 1, characterized in that: said cylinders (A, B, C) of said system of intake dampers (1) are equipped with suitable openings in a shell, one of the cylinders (B) is provided with a keyed septum (B'), said cylinders (A, B, C) of the system of intake dampers and said keyed septum (B') are connected to a shaft and provided at ends of the shaft, means for the reduction of friction (M) and to allow rotation (N).

3. The reversible heat pump device (100) for the production of hot and cold air according to claim 2, characterized in that: said cylinders (A, B, C) of said system of intake dampers (1), said keyed septum (B'), said shaft (L) and said means for friction reduction (M) and to allow rotation (N) are connected to a plenum (0) provided with a first opening on a first side (P) in communication with channels of external air and of internal air, and a second opening on a second side (Q) in communication with the cold exchanger (2) and the hot exchanger (3), and said plenum (0) is equipped with air sealing systems (10) between the intake damper system cylinders and an air passage opening (11) in communication with said openings (P, Q), and between an inner cylinder and an intermediate cylinder and between the intermediate cylinder and an outer cylinder (13) of the concentric cylinders intake damper system.

4. The reversible heat pump device (100) for the production of hot and cold air according to claim 1, characterized in that: said cylinders (D, E, F), of said delivery damper system (4) are equipped with openings in a casing of said cylinders, one of the cylinders (E) of the delivery damper system (4) is provided with a keyed septum (E), said cylinders (D, E, F) of the delivery damper system and a keyed septum (E) connected to a shaft (R) of the cylinders of the delivery damper system, provided at the ends of the shaft, means for reduction of friction (V) and to allow rotation (Z).

5. The reversible heat pump device (100) for the production of hot and cold air according to claim 1, characterized in that: said cylinders (D, E, F) of said delivery damper system (4), a keyed septum (E') of one of said cylinders of said delivery damper system, a shaft (R) and means for friction reduction (V) of the cylinders of the delivery damper system and to allow rotation (Z) are connected to a plenum (T) provided with openings both on a side (U) in communication with channels of external air and ambient air, which on a side (S) in communication with the cold exchanger (2) and the hot exchanger (3), and said plenum (T) is equipped with air sealing systems (14) between the cylinders of the delivery damper system and an opening of an air passage (15) in communication with said openings of one of said sides (S, U), and between an inner cylinder and an intermediate cylinder (16) and between the intermediate cylinder and an outer cylinder (17) of the delivery damper system.

6. The reversible heat pump device (100) for the production of hot and cold air according to claim 1 characterized in that: said cold (2) and hot (3) exchangers forming part of the refrigeration circuit are connected to said intake damper system (1) and to said delivery dampers (4) by means of aeraulic ducts which respectively integrate fans (18, 19) for air movement.

7. The reversible heat pump device (100) for the production of hot and cold air according to claim 1, characterized in that: the reversible heat pump is capable operating in one of four distinct modes selected from the group consisting of cooling, heating, a first defrosting mode and a second defrosting mode.

8. The reversible heat pump device (100) for the production of hot and cold air according to claim 1, characterized in that: in the cooling operation, the flow of air directed to the user is diverted inside the cold exchanger (2) while the air flow from the outside is diverted to the inside of the hot exchanger (3), and a keyed septum (B') of the cylinders of the intake damper system diverts the flow of air in the direction of the cold exchanger (2).

9. The reversible heat pump device (100) for the production of hot and cold air according to claim 1, characterized in that:

in a first defrosting operation, air is taken from the external environment, the cylinders (A, B, C) of the intake damper system rotate with respect to a position of the cooling operation, two cylinders (D, E) of the delivery damper system remain stationary, one cylinder (F) of the delivery damper system rotates with respect to the cooling position, and the air taken from an external environment is diverted towards the hot exchanger (3) and subsequently towards the cold exchanger (2);

in a second defrosting operation, air is not taken from the external environment, two cylinders (A, B, D, E) of each of the intake damper system and the delivery damper system are in a position of the heating operation, one cylinder (C, F) of each of the intake damper system and the delivery damper system rotate with respect to the position of the heating operation, and the air flow is diverted to the hot exchanger (3) and then to the cold exchanger (2).

10. The reversible heat pump device (100) for the production of hot and cold air according to claim 1, characterized in that in the cooling operation, the device (100) comprises: a damper (44) for diverting the flow of air (47) coming from an air-conditioned environment towards a cold exchanger (45); a fan unit to suck the air flow (47) and divert it through the damper (42) into a delivery channel (40) towards the air-conditioned environment; a damper (44) to divert the flow of air (39) coming from an external environment to a hot exchanger (46) and then expel it (41) into the external environment by means of a damper (43).

11. The reversible heat pump device (100) for the production of hot and cold air according to claim 1, characterized in that, in the heating configuration, the device (100) comprises: a damper (44) for diverting the flow of air (47) coming from an air-conditioned environment towards the hot exchanger (46); a fan unit to suck the air flow (47) and divert it through the damper (43) into a delivery channel (41) towards the air-conditioned environment; a damper (44) to divert the flow of air (39) coming from an external environment to a cold exchanger (45) and then expel it (40) into the external environment by means of a damper (42).

* * * * *